(12) United States Patent
Hurwic

(10) Patent No.: US 6,892,537 B1
(45) Date of Patent: May 17, 2005

(54) BRAKE FLUID RESERVOIR, PARTICULARLY FOR A MOTOR VEHICLE

(75) Inventor: Aleksander Hurwic, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/600,969

(22) Filed: Jun. 20, 2003

(30) Foreign Application Priority Data

Jun. 28, 2002 (FR) .................................. 02 08169

(51) Int. Cl.⁷ ............................................. B60T 11/26
(52) U.S. Cl. ........................................ 60/585; 60/592
(58) Field of Search ........................... 60/585, 583, 592

(56) References Cited

U.S. PATENT DOCUMENTS

| | | | |
|---|---|---|---|
| 3,233,411 A | * | 2/1966 | Schubert ..................... 137/320 |
| 3,520,138 A | * | 7/1970 | Stiward ....................... 60/547.1 |
| 3,937,020 A | * | 2/1976 | Bierlein et al. ................ 60/534 |
| 6,434,935 B1 | * | 8/2002 | Rammhofer et al. ........... 60/585 |

* cited by examiner

*Primary Examiner*—Edward K. Look
*Assistant Examiner*—Devin Hanan
(74) *Attorney, Agent, or Firm*—Leo H. McCormick, Jr.; Warren Comstock

(57) ABSTRACT

A brake fluid reservoir (10) for a motor vehicle having at least one impervious and flexible wall (12) whose capacity is adjusted to the volume of brake fluid contained therein to avoid placing the reservoir at a depression with a drop in the level of brake fluid. The flexible wall (12) forms a pouch containing brake fluid and has an outlet arrangement (16) that is initially closed by an impervious membrane (32) that is punctured to supply brake fluid to a second reservoir (20) connected to a brake system.

8 Claims, 2 Drawing Sheets

BRAKE FLUID RESERVOIR, PARTICULARLY FOR A MOTOR VEHICLE

The invention relates to a brake fluid reservoir, particularly for a motor vehicle.

BACKGROUND OF THE INVENTION

Known brake fluid reservoirs are made of rigid material and are generally arranged above the master cylinders of the braking circuits to which they are connected, so that the brake fluid can flow under gravity from the reservoirs to the master cylinders.

In order to avoid the possibility of a depression, which would carry the risk of preventing the fluid from flowing, being created in a brake fluid reservoir, the interior of the reservoir is connected to the surrounding atmosphere via a vent orifice, so as to maintain atmospheric pressure within the reservoir. However, because brake fluid is very sensitive to moisture, because water vapor dissolves in the brake fluid and lowers its boiling point, with a risk of the formation of vapor lock in the braking circuits, and because it is also very inflammable, it is necessary to avoid letting this fluid come into contact with the air or allowing it to escape to the open air, and systems of baffles have to be mounted for this purpose in the reservoir vent holes.

Furthermore, it is commonplace for level detection means to be mounted in these reservoirs, which means are generally enclosed in glass ampoules the fragility of which makes them fairly tricky to handle and to fit, with the inevitable risk of breaking these ampoules.

SUMMARY OF THE INVENTION

It is a particular purpose of the invention to afford a simple, effective and economic solution to these problems.

The subject of the invention is a brake fluid reservoir which can be isolated from the ambient surroundings while at the same time avoiding the risks of the formation of a depression within the reservoir.

The invention proposes to this end a brake fluid reservoir, particularly for a motor vehicle, at least part of this reservoir containing brake fluid, characterized in that this part is sealed with respect to the surrounding atmosphere and comprises at least one impervious and flexible wall allowing its capacity to be adjusted to the volume of brake fluid and/or air it contains, so as to avoid placing the reservoir in depression when the volume of brake fluid in the reservoir drops.

The flexible wall present in the reservoir according to the invention can accompany a drop in level of the fluid in the reservoir and vary the internal volume of the reservoir without that leading to a change in pressure in the reservoir, which means that the latter can be completely isolated from the surrounding atmosphere without the risk of internal depression. This isolation avoids any contact between the brake fluid and water vapor in the reservoir and also prevents the brake fluid from escaping from the reservoir.

In a first embodiment of the invention, the flexible wall sealingly connects two rigid parts of the reservoir, that are mounted so as to be able to move one relative to the other.

As a preference, these two parts of the reservoir comprise an upper part and a lower part, the upper part being able to move in translation on the lower part.

In another embodiment of the invention, the flexible wall forms an upper part of the reservoir, the lower part of which is rigid.

In a preferred embodiment of the invention, the flexible wall forms a pouch inside the reservoir and is initially filled with brake fluid. It advantageously comprises, at the lower part, fluid outlet means sealingly connected to a second reservoir placed at a level below that of the first mentioned reservoir and comprising means of connection to a braking circuit.

In one particularly advantageous embodiment of the invention, the outlet means of the pouch are initially closed off by a sealed membrane and the means of connection to the second reservoir comprise means of puncturing this membrane.

As an alternative, the reservoir according to the invention may comprise two aforesaid pouches initially filled with brake fluid and each of which is connected to one compartment of the second reservoir, each compartment of this second reservoir being connected to a braking circuit.

The invention will be better understood, and other features, details and advantages thereof will become more clearly apparent, from reading the description which follows, given by way of example with reference to the attached drawings.

DETAILED DESCRIPTION OF THE INVENTION

Figure 1:
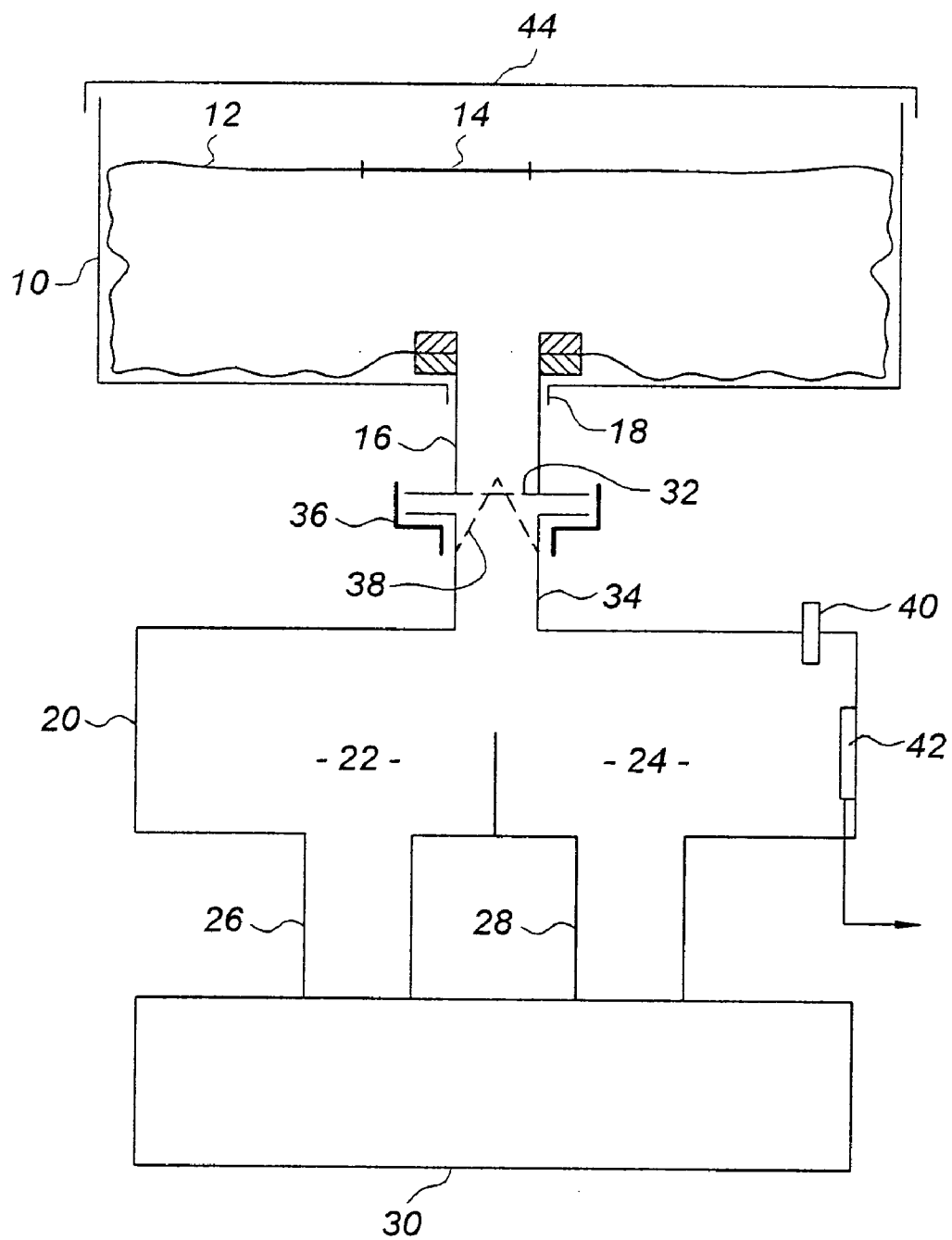
FIG. 1 is a schematic view in vertical section of a brake fluid reservoir according to the invention, connected to a braking circuit.

In FIG. 1, the reference 10 denotes a first reservoir or upper reservoir containing a pouch 12 of flexible material impervious to brake fluid, made for example of an appropriate plastic chemically resistant to brake fluid and possibly having an outer coating for sealing, such as a thin layer of aluminum or similar for example. In this case, the upper part of the pouch 12 advantageously comprises a transparent window 14 allowing visual observation of the inside of this pouch.

The lower part of the pouch 12 is connected with sealing to a tube 16 which extends through an orifice 18 in the lower wall of the reservoir 10 toward a second reservoir 20 placed at a level lower than that of the first reservoir 10 and comprising two compartments 22, 24 each connected by a pipe, 26, 28 respectively, to a double braking circuit 30 of a conventional type.

The lower end of the tube 16 is initially closed by an impervious membrane 32 which is automatically perforated when the lower end of the tube 16 is fixed to the upper end of a pipe 34 feeding the second reservoir 20.

For example, the sealed joint between the tube 16 and the pipe 34 is produced by screwing on a threaded ring 36 which, in succession, tightens the end flanges of the tube 16 and of the pipe 34 together with sealing, then causes the membrane 32 to be perforated by a pointed element 38 mounted fixedly inside the pipe 34, in the upper part thereof.

The two compartments 22, 24 of the lower reservoir 20 are separated from one another in the lower part and communicate in the upper part, making it possible to maintain a minimum level of fluid in one of the compartments if fluid in the braking circuits fed by the other compartment should leak.

A safety valve 40 is also provided on the second reservoir 20, this safety valve allowing escape to the outside in the event of an overpressure within the reservoirs 10, 20, to prevent them bursting.

A level detector 42 of a conventional type is also mounted inside the second reservoir 20 and is connected to an external circuit that warns of a lack of brake fluid.

Initially, the pouch 12 is filled entirely with brake fluid isolated from the surrounding atmosphere by the impervious membrane 32 closing the outlet tube 16 of the pouch 12.

The upper reservoir 10 advantageously comprises a removable lid 44 which is not airtight and is preferably transparent, allowing a pouch 12 filled with brake fluid to be placed without difficulty inside this reservoir and its outlet tube 16 passed through the orifice 18 of the reservoir. Screwing the threaded ring 36 onto the lower end of the tube 16 allows this tube to be connected with sealing to the pipe 34 of the lower reservoir 20 and allows the membrane 32 to be punctured. The tubes of the braking circuit 30 have been filled with brake fluid beforehand, and connecting the pouch 12 to the lower reservoir 20 allows the topping-up of this reservoir. The flexibility of the pouch 12 allows it to collapse down into the upper reservoir 10 as brake fluid flows into the lower reservoir 20. This flow does not cause any air to enter the pouch 12 nor does it cause any relative depression. The brake fluid is thus well protected from any contact with the ambient atmosphere and from the water vapor it may contain. If the detector 42 signals that the brake fluid level has dropped below a minimum level, all that is required is for the ring 36 to be unscrewed and the pouch 12 contained in the upper reservoir 10 changed.

To improve safety, two pouches 12 filled with brake fluid may be placed side by side in the upper reservoir 10, and one of these pouches connected to one compartment 22 of the lower reservoir 20 and the other pouch to the other compartment 24 of this lower reservoir. In this case, the two compartments 22, 24 can be completely separate of each other.

Figure 2:
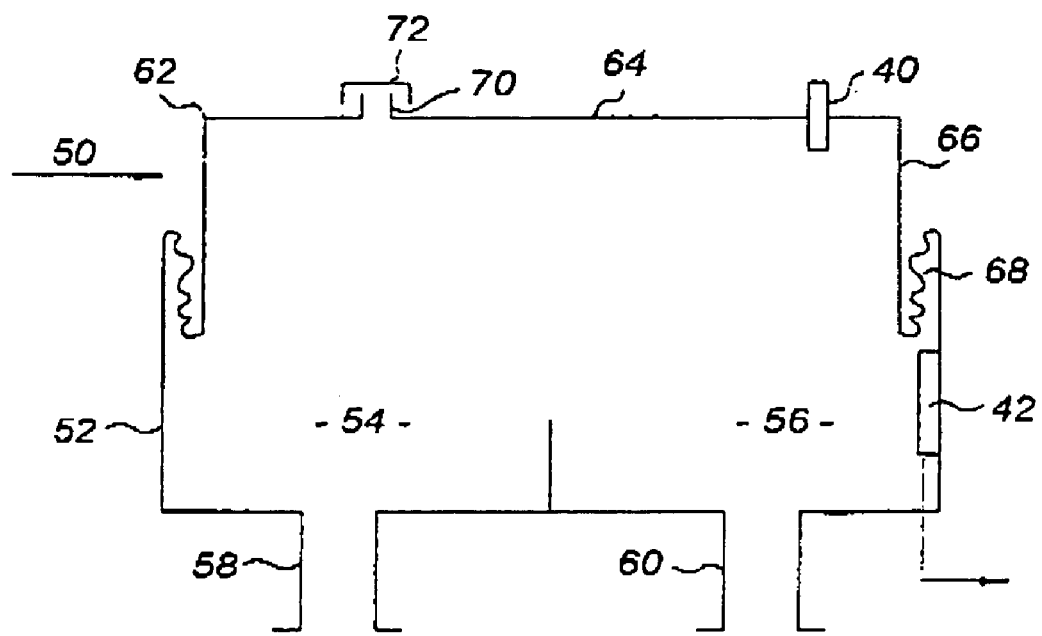
FIGS. 2 and 3 are schematic views in vertical section of alternative forms of embodiment of the reservoir according to the invention.

In the alternative form of the embodiment depicted schematically in FIG. 2, the brake fluid reservoir 50 comprises a rigid lower part 52 of cylindrical or parallelepipedal shape, comprising two compartments 54, 56, each formed with an outlet pipe 58, 60, respectively connected to a braking circuit, and a rigid upper part 62, also of cylindrical or parallelepipedal shape, comprising an upper wall 64 and a peripheral wall or side walls 66 that are connected to the corresponding peripheral wall or corresponding side walls of the lower part 52 by a flexible wall 68 made of a material impervious and resistant to brake fluid.

In this embodiment, the brake fluid entirely fills the reservoir 50, the upper part 62 of which is borne by the brake fluid. The flexible wall 68 allows this upper part 62 to slide or move in translation downward on the lower part 52 when the brake fluid level in the reservoir 50 drops.

A safety valve 40 may be mounted on the upper wall 64 of the upper part 62 of the reservoir, and a level detector 42 may be mounted in the lower part 52 of the reservoir.

The upper wall 64 of the upper part 62 of the reservoir may also comprise a filling orifice 70, sealed by a screw cap 72 or bayonet-type plug.

As a preference, the upper part 62 of the reservoir 50, borne by the brake fluid contained in the reservoir, is made of a lightweight material capable of floating on the brake fluid, so as not to impede the filling of the reservoir 50 at atmospheric pressure.

The flexible wall 68 forms a skirt the upper and lower peripheries of which are sealed to the lower edge of the upper part 62 and to the upper edge of the lower part 52 of the reservoir.

Figure 3:
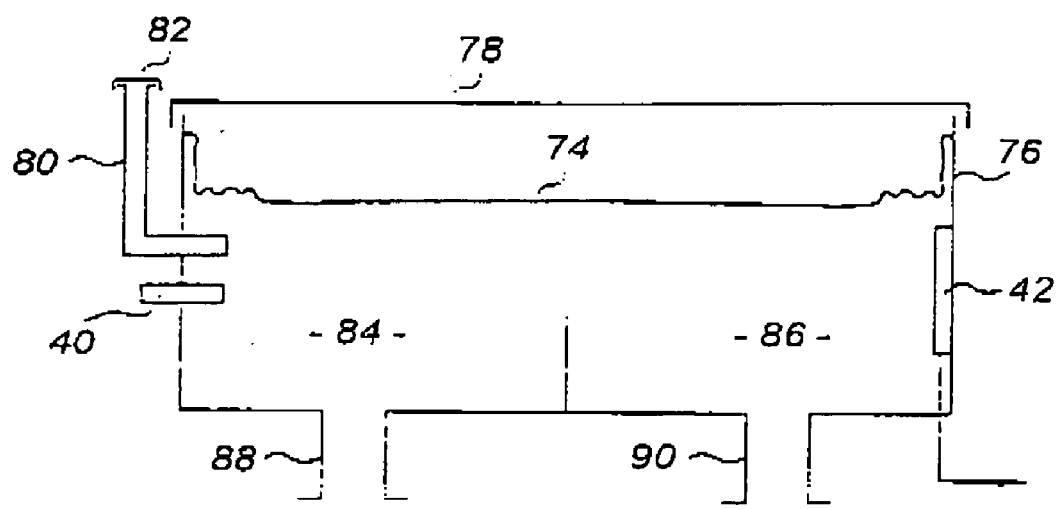

In the alternative form of the embodiment of FIG. 3, the reservoir is made essentially of rigid material, except for its upper wall 74 which is made of flexible material, impervious and resistant to brake fluid, this flexible wall 74 being fixed at its periphery with sealing along the upper edge of the side walls or peripheral walls 76 of the reservoir.

A removable lid 78 may be mounted in the upper edge of the reservoir to protect the flexible wall 74. This lid has dimensions greater than the internal transverse dimensions of the reservoir so that by deformation, but without stretching and therefore without a return force, it can accompany a drop in level of the brake fluid in the reservoir.

In this form of embodiment, the reservoir comprises a filling pipe 80 that can be sealed off using a plug 82, this pipe 80 running from the top of the reservoir and opening into this reservoir under the flexible wall 74. A safety valve 40 is also mounted on the peripheral wall of the reservoir under the flexible wall 74. A level detector 42 may also be mounted in the reservoir, under this flexible wall, as depicted.

For the remainder, the lower part of the reservoir may comprise two compartments 84, 86 each connected by a pipe 88, 90, respectively, to a braking circuit, these two compartments communicating with one another at the upper part, as already described.

I claim:

1. A brake fluid reservoir for a motor vehicle with at least part of said reservoir containing brake fluid, characterized in that said part is sealed with respect to the surrounding atmosphere and comprises at least one impervious and flexible wall (12, 68, 74) that allows its capacity to be adjusted to a volume of brake fluid and/or air retained therein to avoid placing said reservoir in depression with changes in the volume of brake fluid in the reservoir, said flexible wall (68) being sealingly connected to a rigid upper part (62) and a rigid lower part (52) of the reservoir that are mounted to move one relative to each other, said flexible wall (68) connecting said upper part (62) of the reservoir to said lower part (52) such that the upper part (62) being movable in sliding or in translation on the lower part (52).

2. The reservoir according to claim 1, characterized in that the two compartments (22, 24) communicate in the upper part of the second reservoir.

3. The reservoir according to claim 1, characterized in that said reservoir (10) contains two aforementioned pouches (12) containing brake fluid and each is connected to one compartment (22, 24) of said second reservoir (20).

4. The reservoir according to claim 1, characterized in that said flexible wall (12, 68, 74) comprises at least one transparent window (14) for visually checking brake fluid in said pouch.

5. The reservoir according to claim 1, further comprising at least one safety valve (40) and a level detector (42) that are mounted in said second reservoir.

6. A brake fluid reservoir for a motor vehicle with at least part of the reservoir containing brake fluid, characterized in that said part is sealed with respect to the surrounding atmosphere and comprises at least one impervious and flexible wall (12, 68, 74) that adjusts to a volume of brake fluid and/or air contained therein to avoid placing the reservoir (10) in depression with a drop in a volume of brake fluid in the reservoir (10), said flexible wall forming a pouch (12) that retains brake fluid within the reservoir (10), said pouch (12) having a fluid outlet means (16) at a lower part thereof that is sealingly connected through a sealed membrane (32) to two juxtaposed compartments (22, 24) of a second reservoir (20) that are placed at a level below that of said first reservoir (10) and means (26, 28) for connecting said second reservoir (20) to a braking circuit (30), said outlet means (16) of the pouch (12) being initially being closed by a sealed membrane (32) and means (38) for puncturing said sealed membrane (32) to allow fluid therein to flow to said second reservoir (20).

7. The reservoir according to claim 6, characterized in that said flexible wall (12, 68, 74) comprises at least one transparent window (14) for visually checking brake fluid in said pouch(12).

8. The reservoir according to claim 6, further comprising at least one safety valve (40) and a level detector (42) that are mounted in said second reservoir.

* * * * *